United States Patent
Homt et al.

(10) Patent No.: US 6,689,304 B1
(45) Date of Patent: Feb. 10, 2004

(54) METHOD AND APPARATUS FOR IMPROVING CONCENTRICITY IN AUTOMOBILE TIRES

(75) Inventors: Günter Homt, Garbsen (DE); Michael Glinz, Neustadt (DE); Horst Sergel, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/744,990

(22) PCT Filed: Nov. 6, 1998

(86) PCT No.: PCT/EP98/07088

§ 371 (c)(1),
(2), (4) Date: Feb. 16, 2001

(87) PCT Pub. No.: WO00/11445

PCT Pub. Date: Mar. 2, 2000

(30) Foreign Application Priority Data

Aug. 19, 1998 (DE) .......................................... 198 37 680

(51) Int. Cl.[7] ............................................... B29D 30/00
(52) U.S. Cl. ........................ 264/345; 264/326; 425/445; 425/446; 425/28.1; 425/36
(58) Field of Search ................................. 264/326, 315, 264/340, 320, 319, 345, 443; 425/28.1, 36, 58, 445, 446

(56) References Cited

U.S. PATENT DOCUMENTS

| 3,389,193 A | * | 6/1968 | Hughes |
| 3,529,048 A | * | 9/1970 | Kovac et al. |
| 3,550,442 A | | 12/1970 | Carr et al. |
| 3,632,701 A | * | 1/1972 | Devitt et al. |
| 3,719,813 A | | 3/1973 | Friedman et al. |
| 3,862,570 A | | 1/1975 | Ongaro |
| 3,983,193 A | | 9/1976 | Wulker et al. |
| 4,016,020 A | | 4/1977 | Ongaro |
| 4,053,265 A | | 10/1977 | Wulker et al. |
| 4,414,843 A | | 11/1983 | Kounkel et al. |
| 5,458,727 A | | 10/1995 | Meyer |
| 5,537,866 A | | 7/1996 | Bangert et al. |
| 5,616,859 A | * | 4/1997 | Rhyne |

FOREIGN PATENT DOCUMENTS

| DE | 458554 | 4/1928 |
| DE | 7228584 | 11/1972 |
| DE | 2453370 | 5/1975 |
| DE | 2455279 | 8/1976 |
| DE | 2715111 | 10/1978 |
| DE | 4309513 | 3/1994 |
| DE | 4326370 | 2/1995 |
| DE | 4339775 | 6/1995 |
| DE | 19643762 | 5/1998 |
| EP | 0405297 | 1/1991 |
| EP | 0492784 | 7/1992 |
| GB | 2321224 | 7/1998 |
| JP | 61195809 | 8/1986 |

OTHER PUBLICATIONS

DIN 7724.
"Elastomer Webs in Flat Roof Construction."

* cited by examiner

Primary Examiner—Mathieu D. Vargot
(74) Attorney, Agent, or Firm—Greenblum & Bernstein, P.L.C.

(57) ABSTRACT

Process and apparatus for improving a concentricity of a pneumatic vehicle tire having a bead. The process includes subjecting at least a portion of the bead, after vulcanization, to a plastic deformation post-treatment. The post-treatment improves the concentricity of the tire. The apparatus includes a drum having a surface which engages a radially inner bead seat surface of the tire. The drum includes at least one of an internal heating mechanism and an internal cooling mechanism. The drum is adapted to plastically deform at least a portion of the bead of the tire so as to affect at least one of a first, a second, and a third harmonic. The plastic deformation improves the concentricity of the tire.

62 Claims, 8 Drawing Sheets

METHOD AND APPARATUS FOR IMPROVING CONCENTRICITY IN AUTOMOBILE TIRES

CROSS-REFERENCE TO RELATED APPLICATIONS

The present application is a National Stage Application of International Application No. PCT/EP98/07088, filed Nov. 6, 1998. Further, the present application claims priority under 35 U.S.C. §119 of German Application No. 198 37 680.4 filed on Aug. 19, 1998.

BACKGROUND OF THE INVENTION

1. Field of the Invention

The invention relates to a method for improving the concentricity of an automobile tire in which its bead is subjected to post-treatment for improving its concentricity after vulcanization.

2. Discussion of Background Information

German Patent No. 458 554 discloses a process for balancing tube-like hollow shafts made of metal, in which, at the locations where an unevenness in mass distribution causes an excessively large centrifugal force to arise, small inward dents of the shaft wall, i.e., dells, are produced.

In 1972, the German utility model G 72 28 584.8 disclosed a device for monitoring the bead characteristics of motor vehicle tires. In this connection, the tire bead is moved onto a drum, which is apparently divided into segments, and the segments are moved radially apart. The reaction forces exerted on the segments in this process are measured.

In 1998, DE-OS 196 43 762 A1 disclosed a further development of the above-mentioned device in which the conicity of the segments that can be moved radially apart is adapted to the conicity of the rim seat surfaces for the purpose of evening out the compression. Here, it is discussed for the first time that bead rubber can flow plastically under extreme compression. By reducing the maximum compression, this source of errors should be stopped.

DE-PS 24 55 279 C2 discloses a process for balancing a pneumatic wheel by means of plastically deforming the rim.

It is known from DE-OS 27 15 111, in order to reduce tire unbalance, to expose completely vulcanized tires to such a post-treatment that additional rubber is applied or removed on the axially inner side of the bead.

It is known from EP 0 405 297 to locally shift the bead in an analogous manner as in the previously mentioned reference using a detachably mounted disk of adjusted thickness over the circumference in such a way that the bead creates a more even radial force in the tread zone at a given tire deflection.

DE-OS 43 09 513 A1 discloses various processes for improving tire concentricity of a pneumatic wheel, among those a plastic deformation of the rim.

It is known from DE 43 39 775 A1 to remove, preferably to grind down, some rubber from the radially inward pointing bead surface on those locations, i.e., phase positions, where the tire the tire creates too large a radial force or has too large a tread radius. This appears to us to be the nearest prior art.

U.S. Pat. Nos. 3,550,442; 3,719,813; 3,862,570; 4,016,020, and 4,414,843, as well as Japanese Application No. 61-195 809 also relate to the correction of tire unevenness.

The retroactive application of rubber, as known from the above mentioned DE-OS 27 15 111, causes difficulties in practice because the green tires are generally coated with a separation agent before vulcanization. At the locations where rubber is to be applied retroactively and be attached firmly by means of vulcanization, this separation agent must be removed thoroughly and the seam surfaces must be roughened; both processes are several times more expensive than removing rubber, regardless of where from.

A disadvantage of the method according to DE 43 39 775 A1 is that this type of fault compensation is practically irreversible because, as previously explained, the retroactive (re)application of rubber is very expensive; thus it follows that generally the first correction is also the last possibility. Therefore, there must be a very high degree of certainty as to how much must be removed at which location before the irreversible reduction is executed. According to prior experience, good results are achieved herewith only when each treated tire has previously been individually measured, even when the tires of the same batch contain a common systematic defect in addition to the random individual defects.

Another disadvantage of the above mentioned method is that the rubber abrasion causes soiling of the working areas.

Although EP 0 405 297, which has already been cited, avoids these two disadvantages, it is unfavorable for all tire-mounting enterprises, i.e., the automobile manufacturers and the tire dealers, because it requires the handling of two additional components per wheel.

SUMMARY OF THE INVENTION

The invention avoids the disadvantages mentioned herein.

By way of background, the inventors realized that the bead should remain the point of intervention because only by avoiding the tread as a point of intervention will the performance and the useful life of the tire remain unchanged by the correcting measure. They also realized that the problem they were facing could not be solved within the standard ways of thinking; after all, if no additional part is to be used, grinding is to be avoided due to its irreversibility, and its application is decidedly too expensive, no other options seem available at first.

The inventors broke into this seemingly hopeless situation of contradicting goals with their idea of attaining the object by plastically reshaping the bead during post-treatment, at least in certain areas. This is based on the surprising recognition that many rubber mixtures can be reshaped quasi-thermoplastically when a sufficiently high pressure, a sufficiently high temperature, and a sufficiently long period of influence are used. This is surprising insofar as vulcanized rubber mixtures are considered elastomers, see, e.g., DIN 7724. Here it is stated: "Elastomers, also called vulcanized materials or rubber, have a glass transition temperature $T_g$ of less than 0° C. and have no flow range above their operating temperature range up to their dissolution." In the report on the conference "Elastomeric Sheets in Flat Roof Construction" on Mar. 24, 1981 in Frankfurt/Main, printed in the magazine "Kautschuk+Gummi·Kunststoffe, vol. 34, No. 11/81, pages 927 through 937 it is written on page 931, right column, from line 4 on:

"Elastomers are rubber elastic polymer materials which can no longer be molded thermoelastically, therefore, have no flow range. This is now accomplished by the vulcanization process in which the macro-molecules are interlinked via chemical cross-linking so that they can no longer shift in relation to one another, i.e., they cannot flow."

The quasi-thermoplastic flow created according to the present invention proceeds considerably slower than in known thermoplasts and known thermoplastic elastomers. The quasi-thermoplastic flow seems to be not a pure physical gliding-by of chained molecules, but rather a dissolution of highly stressed sulfur bridges and a reconstruction of less stressed sulfur bridges, therefore a remodeling of sulfur bridges:

If the sulfur bridge that is stressed the most and thus contains the most energy is replaced by one of lower stress, then all the other sulfur bridges are stressed more by a small amount. The formerly second most stressed sulfur bridge surrenders also to the additional stress and replaces itself by a less stressed sulfur bridge while releasing energy, and so on. The suggested, but not completely proven, leap of the sulfur bridge connector from one anchor atom of the polymer atom and/or the filler atom to another anchor atom would therefore be in the end a mechanically induced chemical process.

Besides mechanical tension, the course and the result of this chemical process is also influenced by the process temperature and the time available for the process. An increase of the process temperature and/or of the process duration enables the achievement of the same lasting change of measurement by reshaping using a lesser mechanical stress; the reduction of the necessary mechanical stress at an increase of temperature and/or an increase in duration can only be depicted as a linear function in a very small temperature range, if at all.

Even when, with reduced mechanical stress and accordingly higher temperature and/or process duration, the same lasting change of measurement is achieved, the results are not identical because the hardness of the final product is also essential; an increase in process temperature and/or in process duration results not only in the above mentioned and welcome shifting of the sulfur bridges from former to newly found anchor atoms but also in a more frequent breaking, not only of sulfur bridges at the anchor atoms, but also of the sulfur bridges that have become less stable, so that more and shorter sulfur bridges are present after treatment, which effects a greater hardness of the final product.

Therefore, in order to maintain a sufficient degree of softness in the treated bead, excessive processing temperature must be avoided as well as excessive processing duration. The latter must also be avoided due to economic reasons, since the return on the invested capital must not be permitted to be reduced too much by long production times. An advantageous adjustment of the parameters: stress, temperature, and time is provided for by the invention.

It has been proven useful for performing of the process when the rubber mixture contains at least 10 times as much sulfur as is actually used for the formation of the sulfur bridges according to the selected vulcanization data, such as duration of the vulcanization, vulcanization temperature, selection and dosage of activators, as well as selection and dosage of inhibitors in the vulcanizing material; the explanation for this seems to be that, without a sufficient surplus of sulfur in the mixture, the replacement of the highest stressed bridge by a similarly long, yet less stressed sulfur bridge becomes too improbable because the migration paths of some of the sulfur atoms required for this becomes too long; with too small a supply of sulfur, two shorter sulfur bridges, which integrate sulfur atoms from a smaller area and thus require only shorter migration paths, tend to form as the replacement for one long overstressed sulfur bridge. An insufficient sulfur surplus thus acts similarly to an excessive process temperature, i.e., hardens excessively. An especially good quasi-thermoelastic reaction under the influence of heavy pressure is achieved with bead rubber mixtures that contain 30 to 90 times the amount of sulfur that formed the actual sulfur bridges in the vulcanized material.

When the brake of a wheel is used, with the brake usually being positioned in immediate proximity to the rim, the rim is heated considerably which leads to an increase in the diameter of its seating and thus to an increase in compression. In order to maintain the minimum compression even after cooling down of the rim which is necessary to secure the tire against torsion on the rim during force transmission in the longitudinal direction and against its separation at low air pressure the rubber of the bead must elastically expand sufficiently radially inward again after the rim has cooled down.

In order to achieve this certainty, only rubber mixtures whose set is extremely low must be used in the bead area; therefore, bead mixtures are "bred" for the goal of being highly elastic. Due to this, the practical realization of the suggested solution seemed improbable, since a lasting deformation should be achieved.

The problem of the temperature-dependent change in diameter becomes even more severe when one considers the variations of the outside temperatures when a material is used for the rims with a different expansion coefficient in relation to the modulus of elasticity than for the stability carrier of the bead core, thus in particular, in the use of rims made of alloys of aluminum and/or magnesium. As is well known, the linear expansion coefficient for iron is $1.2 \times 10^{-5}$, the modulus of elasticity $2.1 \times 10^5$ N/mm$^2$, however the expansion coefficient for aluminum is $2.2 \times 10^{-5}$, the modulus of elasticity $0.65 \times 10^5$ N/mm$^2$. With increasing outside temperature and an even temperature of the rim and tire bead, therefore, the pressure at the foot of the tire is reduced when an aluminum rim and a steel bead core are used.

To summarize the discussion of the variations in diameters, it has always been important (and continues to be so in the invention) that the residual deformation caused by the operating conditions remains extremely small. The tensions or surface pressures used in the deformation according to the invention are significantly greater than the ones occurring during intended operating conditions, however. And under the influence of this higher mechanical stress, the sulfur-vulcanized rubber reacts quite differently, as discovered by the inventors and described in the paragraphs above. This different material behavior used for the process according to the invention could not be anticipated from extrapolation from the prior known force-deformation behavior.

In contrast to the reaction of thermoplasts and the thermoplastic elastomers, the plasticity realized by the use of significantly higher mechanical tensions is not completely reversible; a single reversion of a previously achieved "quasi-thermoplastic" deformation according to the invention by a second quasi-thermoplastic deformation in the opposite direction deposits a small hardening at the place of treatment. The repeated performance of such a plastic cycle of deformation results finally in brittle fracture; therefore the rubber in the taught area of tension resembles the plasticity reaction of metals rather than that of thermoplastic polymers, referred to here as thermoplasts for short.

A particular attraction of the solution according to the invention is the fact that no material needs to be removed from the bead, or, in fact, from the tire as a whole, during post-treatment, and this is preferably not done.

According to one aspect of the invention, the location(s) in which a radial quantity of the tire exceeds the threshold value are first determined in a manner that is known per se.

As the radial quantity (as being meant throughout the entire application), it is preferable to use the radial force of the tire, which has first been measured as a function of the angle of rotation in one track, in this case, approximately centered, or in several axially distributed tracks. However, it is also possible to use the radius of the tire itself as the radial quantity; variations in the length of the cord from bead to bead are indicated just as well in this manner, although variations in the stiffness such as occur in the areas of overlapping, for instance, are indicated less accurately.

Then, at least at the location in which the radial quantity of the tire exceeds the threshold value and is the largest, preferably in all locations in which the radial quantity exceeds the threshold value by being too large, the radial quantity of the tire is reduced by bringing the bead core closer to the bead seat surface that spans in an essentially axial manner.

Locally bringing the bead core closer to the approximately axial bead seat surface occurs in a practical manner by deforming the bead by regions according to the invention using the local influence of a force component pressing radially from the inside toward the radial outside against the bead seat surface that extends essentially axially and by the influence of heat. This deforming therefore depends on the cooperation of force and heat.

At least one of the two cooperating components of force and heat must be locally differentiated in such a way that it influences only the location(s) to be deformed; according to the invention, the force is locally differentiated, which, according to previous experiments, is easier to embody than the locally different application of heat according to the invention, which is also possible, however. Additionally, it is certainly also possible to administer both force and heat in a locally differentiated manner, i.e., not evenly over the entire bead circumference.

As noted herein, the location(s) in which the radial quantity of the tires crosses a threshold value is (are) determined in a manner that is known per se, although in this case it falls below the threshold. Then, at least at the location in which the radial quantity of the tire falls below the threshold value and is the smallest, preferably in all locations in which the radial quantity falls below the threshold value by being too small, the radial quantity of the tire is increased.

Here, the radial quantity is increased by bringing the bead core further away from the bead seat surface that extends essentially axially.

The local enlargement of distance between the bead core and the approximately axial bead seat surface occurs in a practical manner by way of a localized deformation of the bead according to the invention by a local influence of a force component that presses the bead area to be processed axially inward against its essentially radially extending edges and by the influence of heat. Here again, the cooperation of heat and force are determining factors. As already explained herein, the local increase in distance is also possible by way of local differentiation of heat instead of force, or in addition thereto.

This makes possible for the first time an enlargement of the distance without the necessity of additional parts and/or connecting operations such as gluing, and although reductions in distance have been possible before without additional parts and/or connecting operations, they were only possible by grinding, therefore by loss of material, which adversely influences the balance of the tire and is irreversible.

The enlargement of the distance according to the invention, enables, compared with any reduction of distance, whether compared to reduction according to the invention or conventional reduction by grinding, the compensation of more serious defects because movable or removable volume is influenced from two sides, i.e., both axial sides, and not only from one side, the radial inner side.

The invention provides appropriate measurements for achieving a reduction in distance and teaches appropriate measurements for achieving an increase in distance. In accordance therewith, the force component pressing radially outwardly or axially inwardly should be between 50 and 150 N per mm length of circumference of the sector of the bead surface or bead surfaces, extending essentially axially or radially, in which the plastic reshaping of the bead is intended to occur, and the heat should be, at least in the area of the bead, between 100° C. and 230° C., preferably between 160° C. and 180° C., for a duration of the combined influence of force and heat between 10 minutes and 45 minutes.

A variant of the locally differing application of heat according to the invention in performing the correction method according to the invention is the locally differing cooling closely following or immediately after the vulcanizing, i.e., at a time when the tire is still hot. Thus, in this variant, no additional heat is introduced into the tire but sections in which the bead shall not be deformed are cooled; the sections still to be deformed are not cooled or at least are cooled less. On the contrary, it can be useful to surround the areas of the beads to be deformed with heat insulating mechanisms.

The utilization of the residual heat of vulcanization in the tire is certainly also possible in non-local differentiation of the heat, with only locally differentiated deforming force; here it can be recommended to surround the whole tire bead with heat insulation.

The improved concentricity according to the invention is less suitable for correcting short-wavelength eccentricity, but it is very suitable for correcting long-wavelength disruptions; a correction seems possible up to the sixth harmonic in which a local differentiation in force seems to allow shorter-wavelength corrections than a local differentiation in heat. Taking previous economically limiting conditions into consideration, the process according to the invention is only practical to use for the correction of first, second, and third harmonics of the periodic function that describes the radial quantity over the angle of rotation. The correction of the first harmonic is particularly easy.

According to the invention, it is advisable first to determine a radial quantity of the tire, preferably its radial force, over at least one full rotation as a function of the angle of rotation of the wheel and then to perform an extensive enough Fourier analysis that at least the first—preferably the first, second, and third—harmonic of this function is determined.

After the data acquisition, it must be decided if the maxima of the filtered harmonics shall be reduced or if the minima shall be increased or if reducing of the maxima as well as increasing of the minima shall be performed which is particularly recommended for the treatment of the particularly important first harmonic. A mixed proceeding is also possible, e.g., in such a function that an increase of the minimum and a reduction of the maximum is performed in the first harmonic, and in the second harmonic only the two minima are increased and in the third harmonic the three maxima are reduced.

For reducing a maximum according to the invention, the radial quantity of the tire is reduced in the area of the maximum or the maxima of the relevant harmonic, it need not be a maximum of the function of the radial quantity itself, and is reduced in such a way that the bead core is brought closer to the bead seat surface that extends essentially axially.

For increasing a minimum according to the invention the radial quantity of the tire is increased in the area of the minimum or of the minima of the relevant harmonic, it need not be a minimum of the function of the radial quantity itself, and is increased in such a way that the bead core is brought farther away from the bead seat surface that extends essentially axially.

The average wheel load of a lower mid-class car, such as, e.g., VW Golf, Opel Astra, Ford Escort, or Toyota Corolla, is about 2,750 N. At the present state of tire production technology, the typical amplitude of the superimposed first harmonic in a freshly vulcanized tire is between 40 and 125 N, ergo between about 1.5% and 4.5% of the wheel load, depending on the price the purchaser is willing to pay, and thus the care the manufacturer can expend.

Tires are frequently required in which an amplitude of the first harmonic is less than or equal 80 N. Assuming a tire whose amplitude of the first harmonic is 85 N, the change in radial force need not be 85 N but only 5 N; but if the tire is already being examined and treated, it is recommended to aim at a larger change of radial force, preferably by 20% to 60%, in particular preferably by 40%, of the amplitude to be reduced, in this case by about 35 N. In short, the height and the orientation (and of course the phase position as well) of the useful change in radial force to be desired results from a comparison of the actual variation of radial force with the maximum tolerated variation in radial force.

Proceeding from the data determined in this way and from the measurement parameters of claims 5 and/or 8, claim 14 teaches the measurement of the correct duration of influence t of the deforming force and heat according to the following formula:

$$t = c \frac{\partial R}{(T - T_0)^2}$$

Here, $\partial R_f$ is the desired change in radial force to be determined according to the above mentioned criteria, T the predetermined deformation temperature, c a constant dependent on the rubber mixture and $T_0$ the glass transition temperature of the rubber mixture used in the area of the bead.

For the rubber mixtures customary in the bead area of tires the constant "c" is between 1.0 and $2.8 \times 10^{-7}$ mm$^2$/K$^2$s, for most car tires between 1.6 and $1.8 \times 10^{-7}$ mm$^2$/K$^2$s. The pressure and heat treatment of the tire bead performed according to such a calculation leads to surprisingly low and easily reproducible eccentricities.

The inventors were not satisfied with the impression that most variations in radial force within standard tire series seem randomly distributed. They were able to show that the largest part of the eccentricities are presented as systematic flaws in final assembly of all green tires of a batch in such a way that the required seams are each positioned in the same phase position. Therefore, and due to the above described good reproductivity they suggest:

a) that, during the final assembly of all green tires of one batch, the necessary seams are each arranged in the same phase position and b) that all green tires of this batch in a certain phase position are placed into similar vulcanization forms, preferably the same vulcanization form, and vulcanized, c) that a representative collective of n tires, where "n" preferably equals 8, is removed from this batch, d) and all tires of this collective are cooled off, preferably below 75° C., e) whereafter each tire of this collective is pulled onto a measuring rim and a radial quantity (R$\mu$), preferably the radial force, is measured for each tire over the rotational angle (phi), where "$\mu$" is to run between 1 and "n".

f) whereafter these individually measured function progressions of the radial quantity R$\mu$=f$\mu$ (phi) are linearly averaged according to their phases to a mean radial quantity of $$R_m = f_m(\text{phi}) = 1/n \times [R_1 + R_2 + \ldots + R_{(n-1)} + R_n],$$

g) whereafter, dependent upon the mean radial quantity $R_m$(phi) thus determined, the plastic bead deformation is determined, in the preferred case, according to the invention, and then the plastic bead deformation thus determined is performed on all n tires on this collective, h) that each tire from this collective is then cooled again, preferably under 75° C., is again pulled onto a measuring rim, and the radial quantity (R) is again measured over the angle of rotation (phi), and is compared to predetermined tolerance fields, and, i) if the predetermined tolerance ranges are adhered to, all of the remaining tires from this batch are treated in this manner, plastically deforming the bead (2).

According to a preferred further development of this process according to the invention, an additional representative collective shall be taken from the batch in the rare case of non-compliance with the predetermined ranges of tolerance in which the additional collective contains no tires from the first collective in which the additional collective is treated after which in case of compliance with the predetermined ranges of tolerance all remaining tires of this batch are treated in the same manner of plastically deforming areas of the bead.

The tires of the first attempt for improving the concentricity are therefore declared to be not representative and excluded; suitably, they are treated individually or are devalued in their quality certification. Since previous test experience has only in very rare occasions proven the first randomly selected collective to be not representative, the economical advantages of the collective tire treatment outweigh the disadvantage of the rarely necessary second treatment or devaluation.

The best and most uniform tire quality is achieved when according to the invention a radial quantity, preferably the radial force, is measured not only in a single measuring track, which then would be positioned in the zenith area of the tire, but measured in two tracks, namely right and left from the center of the tire. In case of deviations of radial quantity, whether in the amount or the position of the phase, both beads of the tire can be plastically deformed separately, but preferably simultaneously. Here, the words "separately deformed" mean not only that the amount of the deformation can be different in both beads but also that the area of the length of the arc(s) in which one of the beads is plastically deformed can differ from the area of the length of the arc(s) in which the other bead is plastically deformed. According to previous test results, deviations in the amount of deformation can be achieved with equal success by a temperature differentiation as well as an appropriate deformation force differentiation; a variation in the phase can also be achieved by a temperature differentiation as well as a deformation force differentiation, however, a deformation force differentiation is easier.

Independent of the question of whether, for the sake of simplicity, both beads are treated in the same manner or differently in order to achieve higher precision, there are two possibilities—which can also be combined with one another—to achieve a plastic deformation in predetermined locations of the circumference, and not on others:

a) a bead to be treated is exposed to an expansion stress over its entire circumference but receives a temperature above the necessary deformation temperature only in the areas to be deformed (Key word: localization of the temperature) and/or b) a bead to be treated receives a temperature above the necessary deformation temperature over its entire circumference but only in the areas to be deformed is exposed to expansion forces of such an extent that plastic deformation occurs. (Key word: localization of the deformation force)

For temperature application, particularly easy in case b), it is possible to use the already existing vulcanization heat instead of heating with a separate heat supply. Here, it is useful according to the invention for the tires of a batch, except the tires of the representative collective(s), by way of a sufficiently short time span between the removal from the vulcanization form and performance of the plastic deformation, at least regionally, and/or by way of heat insulating materials that at least wrap around the tire beads the cooling of the tire is braked to the extent that the tires still have a temperature between 100° C. and 230° C., preferably between 160° C. and 180° C. at least in the bead area while being pulled onto the device causing the bead deformation without heat energy being supplied to the tire bead.

Such a processing results in an unchanged energy consumption in the production process compared with the prior art. The comparatively high specific heat of rubber and metal and the low heat conductivity of rubber also results in a particularly fast processing, because the short additional time necessary for setting and removing of the heat protection caps offsets the omission of the considerable time of heating that is otherwise necessary.

The localization of the heat application is harder to realize than localization of the force application due to the heat inertia of the heating devices and only one of the two must occur locally (but both may certainly occur locally). The localization of the heat application in relation to the phase position is most easily realized when the heating device is provided in a fixed phase position on the device and the necessary variability of the phase position is achieved by a mounting of the tire to be deformed onto this device at an appropriate phase instead of mounting the tire in a random phase position and adjusting the phase of the heating device. In the latter embodiment, considerable currents had to be switched over variable electric paths which, in the proximity of rubber, can cause electric arcs resulting in charring.

This problem of realizing a localization of the heat influence (i.e., a locally concentrated heat influence, rather than one acting uniformly over the entire circumference) does not exist, when the localization is achieved not by locally concentrating the heat influence but by locally concentrated heat insulation and/or by a locally complementary cooling. The latter is an object of the invention in which the localization of the heat influence in achieved in such a way that before the deforming force is introduced, the areas of the bead to remain generally undeformed are cooled, preferably to a temperature below 75° C.

The preceding parts of the description are based upon the awareness that tire unevennesses regardless of their origin can be reduced or even removed retroactively by selective plastic deformation of the bead. Here, the word "selective" includes the idea that the amount and phase position of any unevennesses, preferably of the radial force, first in at least one measuring track, preferably in two measuring tracks, are determined and then a bead deformation calculated from the amount and the phase position is performed.

A statistic comparison of tires post-treated in this way with tires that were not post-treated presented the surprising result that tires post-treated in this way do not show any higher variations in material thickness between the inner radius of the bead core and the inner radius of the bead, but rather lower ones. Originally greater variations had been expected over the circumference since a deformation is impressed. This unexpected fact leads to the suggestion that a considerable part, approximately one third, of the tire unevennesses to be compensated according to the invention are variations of previously mentioned material thickness, also called "inner coating thickness." To this extent, the localized plastic bead deformation mentioned above is therefore not only a process to fight a symptom but rather a process that acts on the chain of causality.

According to the above mentioned awareness, the tire evenness is already improved in the statistic average with a non-selective, yet even, and thus leveling, plastic bead deformation. The word "even" relates here to the distances of the deforming sections; the forces are not even: in the phase positions in which more rubber is situated below the bead core more deforming force is introduced in even distances than in the phase positions in which less rubber is situated below the bead core.

In similar fashion to the even bead enlargement—distancewise—an even reduction—also distancewise—of the clear opening of the beads leads to a leveling of the radial force diagram. This is possible, by even axial compression, also distancewise, by exercising pressure on the generally radially extending surfaces of the bead.

All mentioned developments of the process according to the invention for plastic deformation of the bead after the vulcanizing of the tire show that new devices must be designed for their performance. According to prior knowledge these devices cannot be used for anything else but the performance of these processes.

The first variant of the developments of the invention is purposefully embodied according to the invention in that the tire bead is axially pressed onto a conical calibrating rim at a bead temperature between 100° C. and 230° C. Thus, the material distribution is leveled in the core area, in particular between the inner circumference of the bead core and the inner circumference of the bead.

The device according to the invention can be modified in such a way that the conical drum widening the bead is not circular in its cross-section, but rather is designed with an out-of-roundness in the first or second or third degree which leads to a device according to another embodiment of the invention.

"Out-of-roundness in the first degree" means that the cross-sectional profile in each axial position of the cross-sectional plane does not show a constant radius, represented in polar coordinates, but rather a radius R varying according to a function $R=R_m+c \sin \phi$. This leads to an egg-shaped cross-sectional profile.

Out-of-roundness in the second degree means that the cross-sectional profile in each axial position of the cross-sectional plane shows a radius R, represented in polar coordinates, varying according to a function $R=R_m+c \sin(2\phi)$. This leads to an elliptical cross-sectional profile.

Likewise, out-of-roundness in the third degree means that the cross-sectional profile has in each axial position of the cross-sectional plane a radius R in polar coordinates varying according to a function $R=R_m+c \sin(3\phi)$. This leads to a cross-sectional profile similar to a severely rounded triangle.

Likewise, higher degrees are possible but are generally unimportant; the lowering of the amplitude of the first harmonic is most important.

With a device according to the invention, a higher compression is created between bead core and bead seat surface at the places of the greatest curvature of the drum in the cross-section, i.e., at the maxima of R, than in the places of lesser curvature in the drum cross-section. Therefore, rubber is displaced at least more there, and sometimes only there, and that occurs even when the treated tire bead is not locally but evenly hot between 100° C. and 230° C. Thus, a process according to the invention can be performed. A localization of the heat influence is possible additionally, for example, by differences in thermal conductivity.

An advantage of a device according to the invention is the potential one-piece construction of the conical drum so that the constructional expense is particularly small and no gaps between sections must be accepted or bridged. However, the sliding motion at the inner bead seat surface is disadvantageous, making lubrication thereof recommended.

For the performance of another variant of the process according to the invention, i.e., with a reduction instead of an enlargement of the clear opening of a bead, instead of a conical calibrating rim or a drum in which all sections are extended an equal distance by an appropriate positive control system, a device of such kind is necessary that has two clamping-jaw like rings per bead which can be moved toward each other and which axially compress the relevant bead core between them. For this only one of the two rings need to be movable and none of the rings need to be divided into sections.

The latter embodiment of the two rings axially movable toward each other, which is not divided into sections, results in a particularly low construction expense and, due to its gap-free and edge free design, a particularly good surface quality in the finished tire bead; a device so embodied is provided herein.

The plastic transformation occurs when the two rings are moved together that each axially compress a bead essentially in the areas in which particularly much material is positioned beside the bead core and consequently particularly little material is underneath the bead core. The equality of distance leads therefore to a leveling of the geometry in the deformation.

The device according to the invention can be modified in such a way that the two rings acting on a bead are not guided toward each other coaxially but rather with an adjustable offset which leads to a device which is suitable for the performance of processes according to the invention.

An "Offset" mechanism is provided by the invention so that the rotational axes of the two rings do meet at a location in the middle of the average distance between the two rings (which is expressed in "concentric"), but they meet only in one point, therefore they do not coincide (which would be expressed in "coaxial"), but are positioned at an adjustable acute angle to one other. If the device were to be allowed to rotate, at least one of the two rings would seem to wobble. The term "wobbling" in the features of claim 24 is actually superfluous; it is only listed there because sometimes the terms "disaxial", "offset", and "offsetable" are not as precisely distinguished in the German language from "eccentric" etc., as is actually correct. The combination of the terms concentric and coaxial could also be called "aligned".

Although this way of performing the process makes it possible to influence only the first harmonic and not the higher harmonics of the variations in radial force or in radius, the devices required for it are particularly inexpensive, particularly reliable in operation and they result in a prime surface quality which finally is a result of the one-piece construction of the pressure rings.

Universally applicable devices are described below which also permit, in particular, the influencing of higher harmonics but due to their multi-piece construction are more expensive.

In the process variants in which rubber is pressed radially from the inside toward the outside, thus process variants according to claims 3 and/or 4, the multi-piece device also has the shape of a drum. The latter has at least two segments of which at least one must be radially movable; preferably it should have more segments, in particular preferably twelve. Preferably all its segments are radially movable.

Drums with those features are known per se and are used prior for the construction of green tires in the tire industry.

In order to be usable in the process according to the invention, such drums must be able to create considerably larger spreading forces without any damage, namely such as they result after multiplication with the appropriate circumference. The loading stress of the drums necessary for the performance of the process according to the invention is more than 2 times the power of ten above the prior known drums. The dimensions of its spreading mechanism alone separates the new drums discussed here to be created according to the invention considerably from those known in the tire industry.

Insofar as the option of using the vulcanization heat is not utilized, drums for the performance of the process additionally need the ability to heat at least one, preferably all, of its sections according to the invention. Therefore, the section surface designated for the contact and the plastic deforming pressure onto the essentially axially extending bead seat surface or at least one of its sections is heatable to the extent that a temperature between 100° C. and 230° C., preferably between 160° C. and 180° C., can be achieved.

If the option of using the vulcanization heat is to be utilized, not a single section needs to be heatable; as described above, such embodiment are preferred in mass production and post-treatment.

Concerning the performance of the process for enabling the embodiment of the process according to the invention such drums are preferred according to the invention in which at least one, preferably all, of its sections can be cooled in such a way that its (their) section surface(s) which is or are designated for the contact and the plastic deforming compression of the essentially axially extending bead seat surface can reach a temperature of below 100° C., preferably below 75° C.

For the performance of a process analogous to the invention as an equivalent substitute for a conical calibrating rim, the use of such a drum would also be possible, of which all sections are extended an equal distance by an appropriate positive control system. The plastic deformation then occurs essentially in the areas in which particularly much material is situated below the bead core.

Drums that can be extended over their circumference only evenly are useful further for the variants of the process in which the temperature influence occurs locally, either by local heating or by cooling in complementary areas.

Particularly preferred, however, are such embodiments of the drum in which according to the invention the sections can be extruded to different extents. Here, a particularly precise and in almost all cases optimal local distribution (in this application called "localization") of the deformation force can be achieved.

For the variant of the process in which rubber is pressed radially inwards from the sides, variants of the process according to the invention, also the multi-piece device has a form that could be called a vice with clamping jaws in the form of a ring. Since only vices with short straight clamping jaws seem to be known, only the general term "device" is used here.

Such a device has according to the invention at least two rings for the clamping of a tire bead in which at least one of the rings is divided into at least two, preferably twelve sections of which at least one can be moved axially. Preferably all sections of one or both rings are axially movable.

It would be sufficient, in general, if only sections of one of the two rings cooperating for each bead were axially movable and then preferably the sections of the axially inner ring. Specifically, possible steps or ridges somewhat resembling flash at the segment seams—especially in the case of significantly different extension lengths of neighboring segments—are less of a problem on the axially inner side than on the outer side where they could interfere with the flush contact between the rim flange and the tire bead.

In order to avoid steps and ridges, it is also possible, just as in the devices that press radially from the inside toward the outside, to provide a smoothing rubber ring or a smoothing rubber collar over the sections preferably produced from metal so that these comparatively hard sections do not act directly on the bead to be deformed, but only indirectly via the smoothing rubber component.

Especially large displacements of the bead core away from the bead seat surface are possible when the axially opposite sections of both rings can be moved axially toward each other. Here, it is possible to correct only long-wavelength disturbances with a section advance of the axially outer ring, preferably only those of the first harmonic, while acting at shorter wavelengths with the segment advance of the axially inner ring, preferably to provide two maxima, of which one is equiphase to the preferably only maximum in the section advance of the axially outer ring.

Furthermore, it is possible when using two rings of axially advanceable sections that only one of the rings, preferably the axially outer one, has a ridge leveling rubber ring on the side facing the bead to be processed.

In similar fashion to the drums, the vise-like devices for axial bead compression also require the ability to heat at least one, preferably all, of its sections, at least when the option of using the vulcanization heat is not used. Thus, at least one, preferably all, of the sections can be heated in such a way that its or their section surface(s), which is or are provided for contact with and plastic deforming pressure on the surfaces that extend essentially radially, can achieve a temperature between 100° C. and 230° C., preferably between 160° C. and 180° C.

However, if the option of utilizing the vulcanization heat is used, not a single section needs to be heatable as already mentioned analogously for the radially pressing drums. As already mentioned in the description of the process features such embodiments are preferred in mass production and post-treatment.

Concerning the performance of a process for facilitating a process embodiment according to the invention, such device embodiments are preferred, in a manner similar to that described herein for drums, in which at least one, preferably all, of its sections can be cooled and whose section surface(s) provided for contact and plastic deforming pressure on the lateral bead surfaces which extend essentially radially can achieve a temperature below 100° C., preferably below 75° C.

The greatest flexibility in application—of course, it also involves the highest construction cost—is provided by drums in which each section is adjustable to different temperatures by independent cooling and/or heating.

Like all multi-piece plastic deforming tools, the drums and rings addressed in this application have the problem that ridges can be pressed into the bead—the work piece to be deformed—which are undesirable, in particular very undesirable on the radial inner bead seat surface, where tires for tubeless use as is presently customary achieve the necessary seal to the rim. In another part of this application it was proposed to buffer or bridge these ridges and gaps with rubber collars. The invention provides as an alternative to "pull back" the tool sections in the proximity of their borders, i.e., to let the sections run out in the proximity of the border so gently that they no longer exert a sufficient pressure. In the specific example of a drum, this means that the sections movable against each other shall be flattened in their borders, also called seams.

In order to reduce the forces necessary for deformation and in particular to further improve reproducibility of the plastic deformation achieved at the completely vulcanized tire bead, it is recommended according to the invention, to set the bead into vibration, preferably in the ultrasonic range, at least in sections, during plastic deforming post-treatment, in the areas in which the only or the largest deformation is to be achieved. This can be achieved by a high-frequency alternating magnetic field that acts on the bead core containing iron. The impact of the force can therefore occur first by an electric and/or magnetic alternating field first on the bead core and only then be transmitted by it onto the bead rubber to be deformed.

If such a field is applied in a circulating, i.e., rotating fashion, it can also be used simultaneously for inductive heating of the bead which thus results in a heat flow from the bead core to the bead surface.

A localized (=selective) introduction of vibrations, i.e., uneven over the circumference, seems easier to achieve, however, since at least one of the components in contact with the bead vibrates during the plastic deformation.

The invention provides a process for improving a concentricity of a pneumatic vehicle tire having a bead, the process comprising subjecting at least a portion of the bead, after vulcanization, to a plastic deformation post-treatment, wherein the post-treatment improves the concentricity of the tire.

The portion of the bead may be deformed without material being removed during the post-treatment. The subjecting may comprise applying locally an essentially axial force component $F_R$ to a seat surface of the portion of the bead, the force component being directed radially outwardly from a radially inwardly position. The subjecting may further comprise locally heating a seat surface of the portion of the bead. The subjecting may comprise locally heating a seat surface of the portion of the bead. The subjecting may comprise applying locally an essentially radial force component $F_R$ to a seat surface of the portion of the bead, the force component being directed radially outwards from a radially inwardly position. The subjecting may further comprise locally heating a seat surface of the portion of the bead. The force component $F_R$ may be between 50 and 150 N per mm of a circumferential length of a sector of a bead seat surface. The heating may comprise heating at a temperature of between 100° C. and 230° C. The temperature may be between 160° C. and 180° C. for between 10 minutes and 45 minutes. The subjecting may comprise locally applying a force component Fa to axially compress the portion of the bead. The force component Fa may be between 50 and 150 N per mm of a circumferential length of a sector of a bead seat surface. The heating may comprise heating an upper portion of the portion of the bead.

The process may further comprise determining at least one location when a radial quantity R of the tire exceeds a threshold value, and reducing the radial quantity R of at least that location when the threshold value is exceeded. The radial quantity R may be a radial force. The reducing may comprise causing a portion of a bead core arranged in the bead to move toward a bead seat surface. The process may further comprise determining at least one location when a radial quantity R of the tire falls below a threshold value, and increasing the radial quantity R of at least that location when the threshold value is exceeded. The radial quantity R may be one of a radial force and a tread radius. The increasing may comprise causing a portion of a bead core arranged in the bead to move away from a bead seat surface. The radial quantity R may be determined over at least one complete turn of the tire and as a function of an angle of rotation of the tire. The radial quantity R may be determined over at least one complete turn of the tire and as a function of an angle of rotation of the tire. At least one of a first, a second, and a third harmonic of the function may be determined using a Fourier analysis. At least one of a first, a second, and a third harmonic of the function may be determined using a Fourier analysis. The quantity R may be reduced when a maximum of at least one of the first harmonic, the second harmonic and the third harmonic is determined. The quantity R may be increased when a minimum of at least one of the first harmonic, the second harmonic and the third harmonic is determined. Each of a maximum of the quantity R the maximum of the first harmonic may be reduced and each of a minimum of the radial quantity R and the minimum of the first harmonic may be increased. Each of a maximum of the quantity R the maximum of the first harmonic may be reduced and each of a minimum of the radial quantity R and the minimum of the first harmonic may be increased.

The portion of the bead may be deformed according to the formula:

$$t = c \frac{\partial R}{(T - T_0)^2}$$

wherein $\partial R_f$ is a desired change in radial force to be determined;

wherein T is a predetermined deformation temperature;

wherein c is a constant which is dependent on a rubber mixture;

wherein $T_o$ is a glass transition temperature of the rubber mixture used in an area of the bead; and wherein t is the time required to affect a change in the portion of the bead.

"c" may be between 1.0 and $2.8 \times 10^{-7}$ mm²/K²s. "c" may be between 1.6 and $1.8 \times 10^{-7}$ mm²/K²s.

The invention also provides for a process for improving a concentricity of a plurality of pneumatic vehicle tires each having a bead, the process comprising providing a batch of "n" number of green tires each having a seam, orienting the seams to have the same phase position, vulcanizing the batch of green tires on at least one vulcanization form, allowing the batch of green tires to cool, measuring each of the green tires to determine a radial quantity R over a rotation angle, determining a mean radial quantity $R_m$ by averaging the radial quantities R according to their phase, determining how much to deform a portion of the bead of at least one green tire using $R_m$, and subjecting the portion of the bead of the at least one green tire to plastic deformation, wherein the subjecting improves the concentricity of each tire in the batch.

"n" may be eight. The radial quantity R may be a radial force. The determining of the mean radial quantity $R_m$ may be based upon the formula:

$$R_m = f_m(\text{phi}) = 1/n \times (R_1 + R_2 + \ldots = R_{(n-1)} + R_n),$$

wherein $f_m$ is a radial force over a rotation angle phi;

wherein "n" is the number of green tires in the batch; and wherein R is the radial quantity for each green tire.

The green tires may be processed until each tire in the batch meets a predetermined concentricity tolerance. The cooling may be performed at a temperature under 75° C. The at least one green tire may be processed until it meets a predetermined concentricity tolerance, and thereafter all remaining green tires in the batch are processed in the same manner as the at least one green tire.

The invention also provides for a process for improving a concentricity of a pneumatic vehicle tire having two beads, the process comprising subjecting at least a portion of one bead, after vulcanization, to a plastic deformation post-treatment, subjecting at least a portion of another bead, after vulcanization, to a plastic deformation post-treatment, wherein the post-treatment improves the concentricity of the tire. Each subjecting may occur separately. Each of the beads may be subjected to a different amount of plastic deformation post-treatment. The different portions of each of the beads may be subjected to a different amount of plastic deformation post-treatment.

The invention further provides for a process for improving a concentricity of a pneumatic vehicle tire having a bead, the process comprising mounting the tire on a drum which comprises at least one of an internal heating mechanism and internal cooling mechanism, subjecting at least a portion of the bead, after vulcanization, to a plastic deformation post-treatment using the drum, wherein the post-treatment improves the concentricity of the tire.

The invention also contemplates a device for improving concentricity of a pneumatic vehicle tire having a bead, the device comprising a drum having a surface which engages a radially inner bead seat surface of the tire, the drum comprising at least one of an internal heating mechanism and an internal cooling mechanism, the drum being adapted to plastically deform at least a portion of the bead of the tire so as to affect at least one of a first, a second, and a third harmonic, wherein the plastic deformation improves the concentricity of the tire.

The drum may comprise at least two curved segments which are mechanically moveable relative to one another. At least one of the segments may be heated by the internal heating mechanism. At least one of the segments is cooled by the internal cooling mechanism. Each segment may comprise a surface which is adapted to engage a radially inner seat surface of the bead. At least one of the segments may be axially moveable. At least one of the segments may be radially moveable. At least one segment can absorb a radial force equal to a product of 50 N/mm times a circumferential length of the at least one segment. The internal heating mechanism may be capable of heating to a temperature of between 100° C. and 230° C. The internal heating mechanism may be capable of heating to a temperature of between 160° C. and 180° C. The internal cooling mechanism may be capable of cooling to a temperature below 100° C. The internal cooling mechanism may be capable of cooling to a temperature below 75° C. Each segment may be separately movable to different positions. Each segment may be adjusted to a different temperature. The drum may include at least one flattened portion in an area where the segments meet. The drum may be capable of causing the bead to vibrate. The drum may be capable of causing the bead to vibrate in an ultrasonic range. The drum may be adapted to simultaneously plastically deform the portion of the bead and to cause a rubber of the bead to vibrate.

BRIEF DESCRIPTION OF THE DRAWINGS

The invention is explained below using the figures. Specifically.

DETAILED DESCRIPTION OF THE INVENTION

Figure 1:
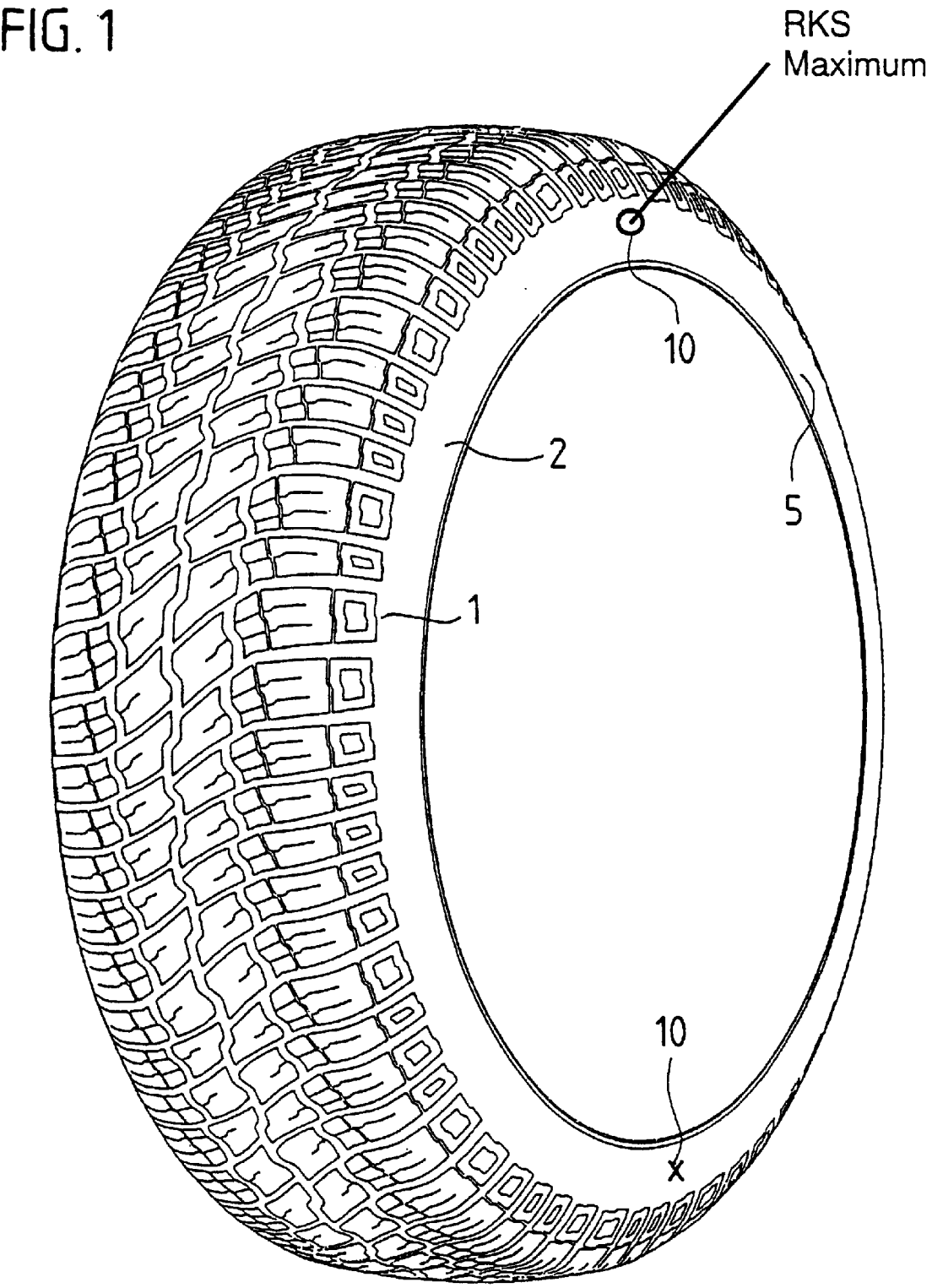
FIG. 1 shows a known pneumatic vehicle tire with an RKS of which the maximum of the first harmonic is marked.

FIG. 1 shows a known pneumatic vehicle tire 1 with a bead 2. The tire 1 has a radial force variation (=RKS). The position of the maximum of this RKS is made clearly visible by a mark 10 on a tire sidewall 5 on the tire 1. RKS analyses and the devices appropriate therefor are common to those skilled in the art; for example, they are described in DE-OS 43 39 775.1 A1.

All marks 10 used should be structured such that they can be read by operating personnel without any aids such as magnifying glasses, eyeglasses, magnetic field detectors, etc. as well as by automated machines. Preferably, such printed, removable adhesive labels are used as the marks 10 that a collected set of data from the RKS analysis is present for the subsequent treatment steps.

Preferably, the data collection occurs in the form that the location of the maximum of the first harmonic is marked, for example, by a red circle inside which the level of amplitude is indicated.

The marking of the minimum of the first harmonic is then no longer necessary because, by definition, it is located 180° out of phase. However, marking the minimum is recommended nonetheless because, for one thing, a redundance is achieved thereby (for example, if an adhesive label is accidentally pulled off, found on the floor by someone, and reattached, but unfortunately in the wrong place, the redundance would reveal such an error) and, for another thing, any alternative or additional treatment of the minimum is facilitated.

For the purpose of marking the minimum of the first harmonic, for example, a green X could be appropriate, upon which the amplitude figure (which is naturally the same, with the exception of the sign) is likewise indicated.

Insofar as the achievable price for the tires also allows the inspection and, optionally, treatment, of the second harmonic, the two maximums of the second harmonic could each be marked with a red double circle (either two circles next to one another or, preferably, two concentric circles of different sizes) and the two minimums of the second harmonic could each be marked with a green double X. The appropriate amplitude level should also be provided in or on these marks.

Analogously, it is possible to mark the extremes of the third harmonic using three concentric circles and XXX and to treat them thereafter; according to present estimations, however, tire buyers are currently unwilling to pay for this.

The term "harmonic" is always used here in reference to and consistently with Fourier analyses. The first harmonic is therefore a sine wave over the angle of rotation with amplitudes and phase positions that can be determined according to Fourier with the period length of 360°; the second harmonic is a sine wave over the angle of rotation with amplitudes and phase positions that can be determined according to Fourier with the period length of 180°; the third harmonic is a sine wave over the angle of rotation with amplitudes and phase positions that can be determined according to Fourier with the period length of 90°, and so on. The real RKS graph should therefore first be subjected to a Fourier analysis. As a rule, this analysis can be broken off after the second harmonic.

Figure 2:
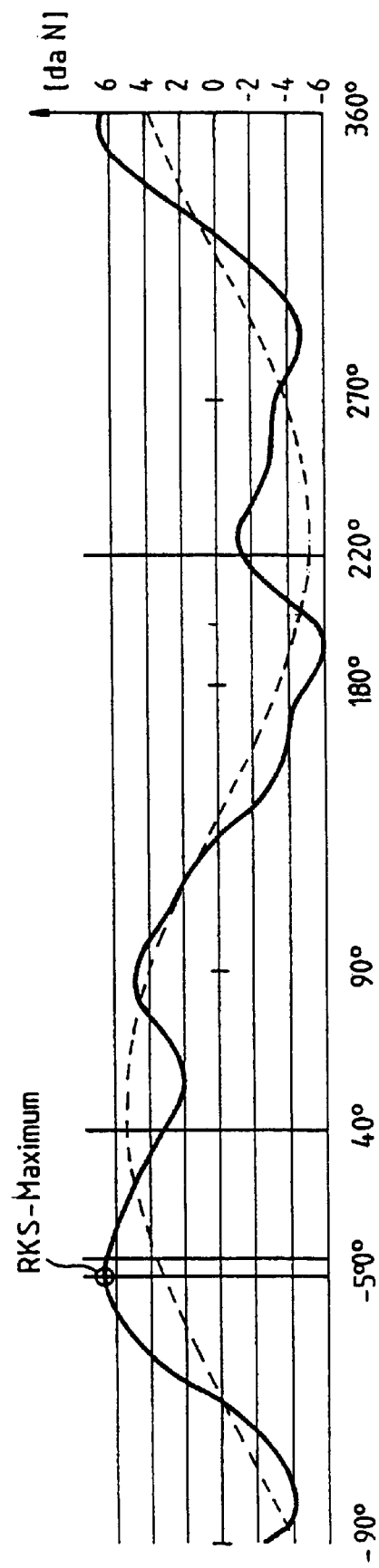
FIG. 2 shows a corresponding RKS graph and the corresponding first harmonic.

FIG. 2 shows such an RKS graph for the tire 1 according to FIG. 1 as a solid line. Its maximum lies at −5° and measures approximately 6.6 daN (each horizontal scale division stands for 2 daN). The first harmonic pertaining thereto is shown as a dashed line. Its maximum lies at approximately 40° and measures approximately 5.4 daN. Its minimum therefore lies at 220° and −5.4 daN.

After the harmonic analysis of the RKS graph, the decision is made for each individual tire or for collectives of tires whether they will be subjected to bead-deforming post-treatment and, if so, which one. Negligible defects are not treated at all and, in tires with small defects, only either the minimum or the maximum of the first harmonic should be treated (insofar as, as is customary, the quality standards only relate to the first harmonic), in tires with mid-sized defects, both extremes of the first harmonic should be treated. Tires with larger defects are to be prevented using other means.

In the case of small defects, which is especially common in our plants, for which there is a choice between increasing the minimum and reducing the maximum, it is recommended to inspect the so-called bead fitting line, i.e., the strength of the bead pressure on a standard measuring rim. If the pressure lies at a higher level than the average in the standardized interval, the RKS maximums should be reduced; on the other hand, if the pressing lies at a lower level than the average in the standardized interval, the RKS minimums should be increased.

Figure 3:
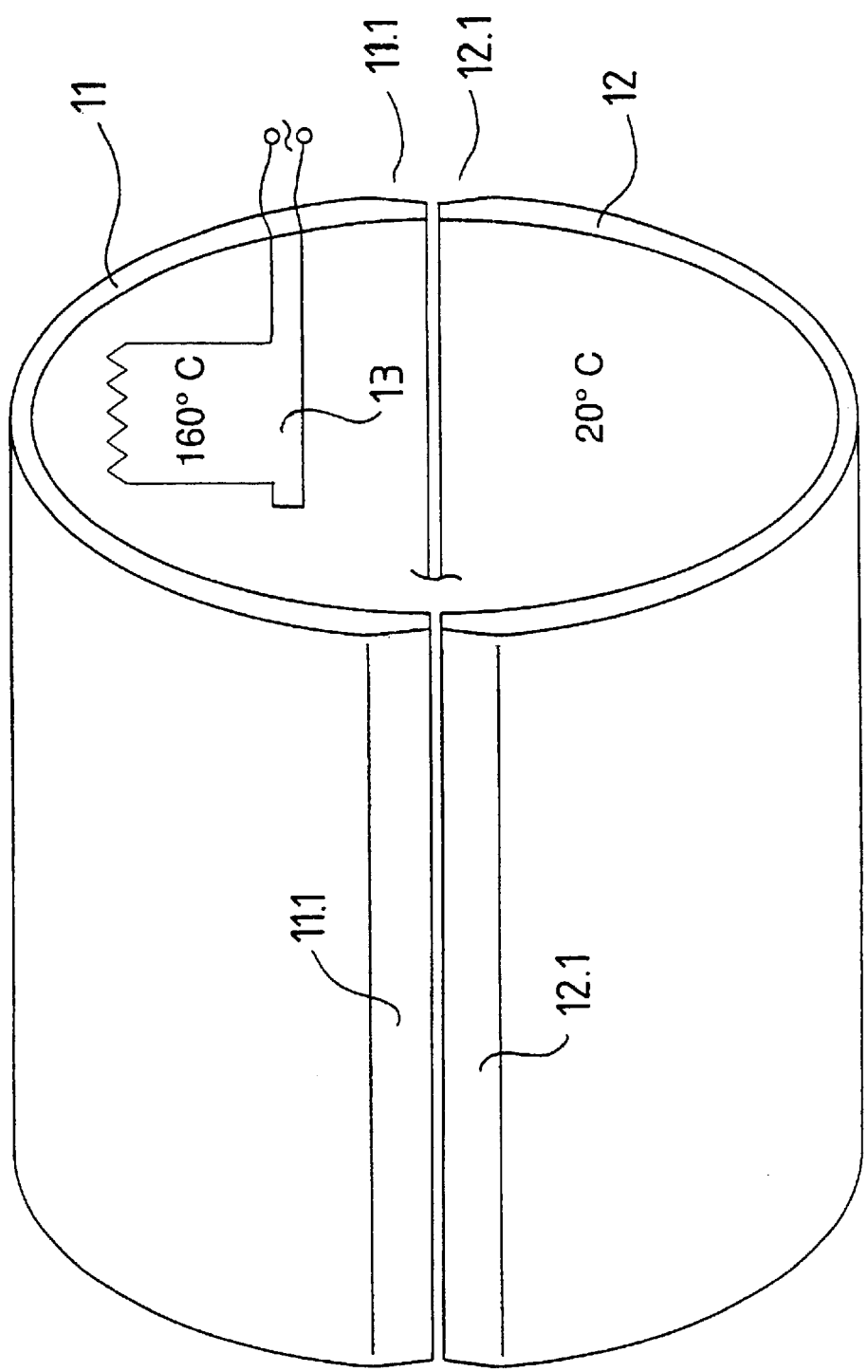
FIG. 3 shows a schematic view of a device which can be used for reducing the maxima of the first harmonic and, in a slight modification, also of the second harmonic, each by the radial application of force.

FIG. 3 depicts schematically a device that can be used for reducing the maxima of the first harmonic and, in a simple modification, those of the second harmonic as well, in each case by way of radial application of force; the later FIGS. 6, 7, and 8 shall show the possibilities for treating the minima.

The drum-shaped device has a section 11 shown above and a section 12 shown below. In the setting shown, both sections have been moved nearly together. The upper section 11 has an electric resistance heater 13 in the middle of its arc length that is regulated to 160° C. by way of a thermostat. The lower section 12 has a temperature of approximately 20° C.

If, due to a lack of space in a production line, the tires must be treated in rapid succession directly after vulcanization, an option for cooling the lower section is recommended for maintaining such a temperature.

In accordance with the generally valid teaching that heating is cheaper than cooling, at least for the purpose of combating the first harmonic, it is advantageous when the vulcanization heat is not exploited, the tires are therefore allowed to cool in peace until their periphery has reached approximately 30° C. for automobile tires and approximately 25° C. for truck tires. Then the tires are pulled onto the device according to FIG. 3 and the simple convection cooling of the lower shell, achieved in particular during idle periods, is sufficient and a forced cooling by way of cooling coils and compressors or the like is eliminated.

If, as is shown in FIG. 3, only one of the two sections is heated, a bead deformation is achieved on this one. On the unheated section, the tire bead is subjected to the same pressure, but as long as the increased temperature is not added, this leads to practically no lasting deformation.

The device shown here is only appropriate for treating the first harmonic; with the installation of another electrical heater, namely in the section 12 shown below as well, it would become appropriate for treating the second harmonic. If the two sections 11, 12 were to be spread, a plastic bead deformation would be achieved in the middle of both segments 11, 12 due to sufficient pressing force and heat. At phase offsets of 90° and 270° thereto, practically no deformation is achieved because the section temperature is hardly increased and, additionally, hardly any pressure is present.

If the two heaters are embodied as being separately switchable, the device is suitable according to need for combating the first harmonic (for which purpose precisely one section is heated) as well as for combatting the second harmonic (for which purpose both sections are heated, especially in their center region).

If the amplitude of the first harmonic as well as that of the second harmonic are both to be reduced and if this is to occur in a collective treatment, i.e., without RKS measurement of each individual tire (tires to be measured and therefore to be loaded for this purpose must be cool), this preferably occurs in the order that first the amplitude of the second harmonic is reduced and only thereafter the amplitude of the first harmonic is reduced. While technicians are used to doing the most important thing first, in this case the reduction of the first harmonic, decreased costs result from the inverse order recommended above, in particular for heating energy, as is discussed in the following.

The tires are moved onto the device according to FIG. 3 rapidly after their vulcanization, i.e., in their still-hot state. The electric power consumption of heating both shells 10 and 11 is then considerably reduced in relation to heating up from 20° C., and therefore only any deviations in temperature that may arise due to idle times of different lengths after the completion of vulcanization must be compensated for. The tires are then allowed to cool in peace in order to treat the first harmonic beginning with cool tires.

On the other hand, in situations where, as an exception, cooling can be achieved more cheaply than heating, e.g., by way of a stream of water that can be used for cooling, uneven harmonics, in particular the first, can be reduced by way of intentionally cooling the section that should not be deformed instead of intentionally heating the section that should be deformed.

In order to avoid injury to the radially inner bead surfaces of the tires to be treated, section 11 has flattenings 11.1 at both jacket edges; for the same reason the unheated section 12 also has equivalent flattenings 12.1.

Figure 4:
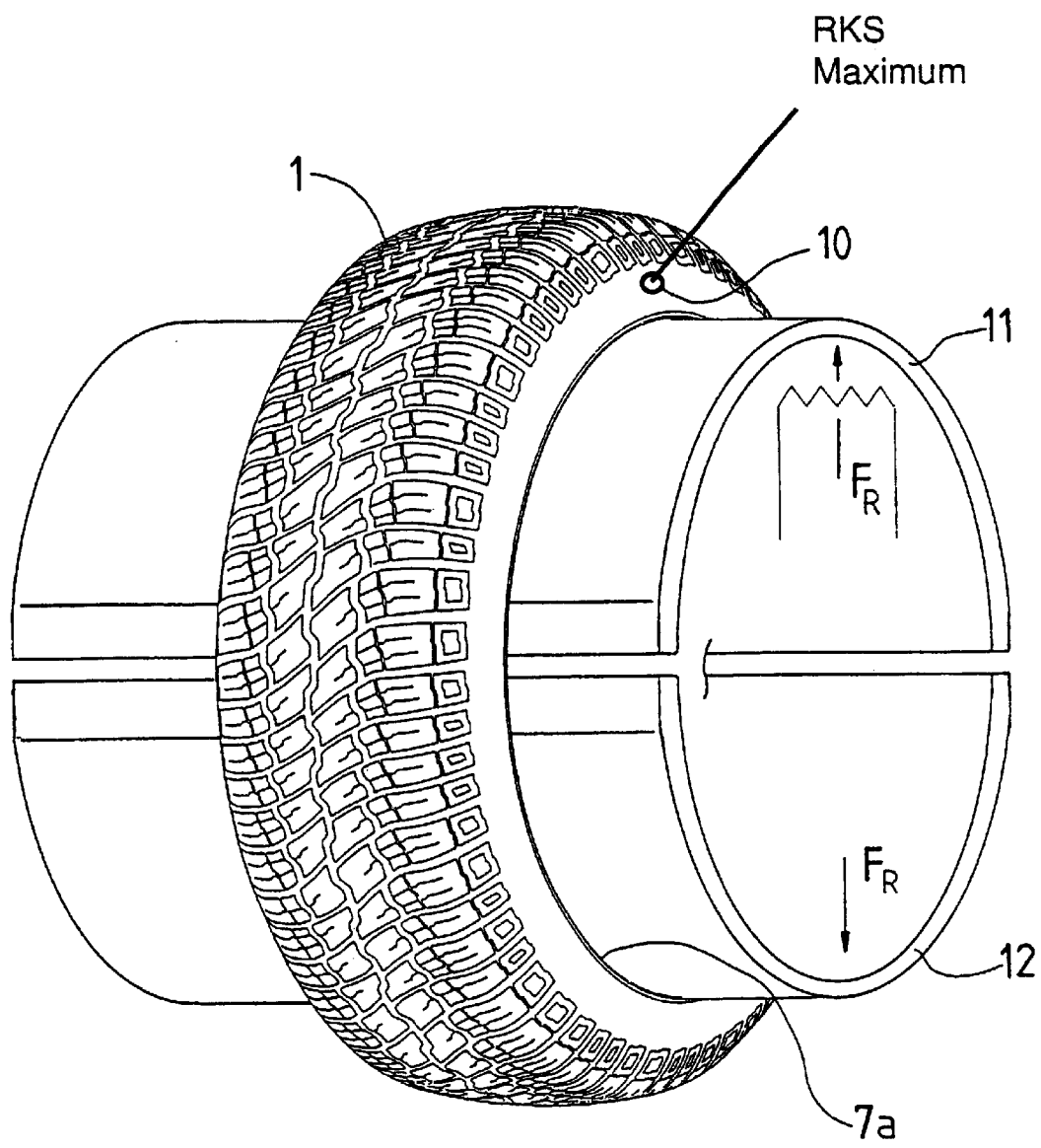
FIG. 4 shows the device according to FIG. 3 in action for reducing the first harmonic.

FIG. 4 depicts the device according to FIG. 3 in action: For this purpose, the pneumatic vehicle tire 1 of FIG. 1 is mounted onto the device 11/12. In order to reduce the first harmonic of the RKS, the tire 1 is rotated in such a way that its RKS maximum, previously marked with the mark 10, stops exactly in the middle of the heated section 11 of the device. Then the two sections 11 and 12 are radially separated in a controlled fashion with a spreading radial force $F_R$; they are depicted here in their separated position. Therefore, in the peak of the two sections 11 and 12, a high pressure acts on the bead seat surfaces 7a that extend essentially axially.

Figure 5:
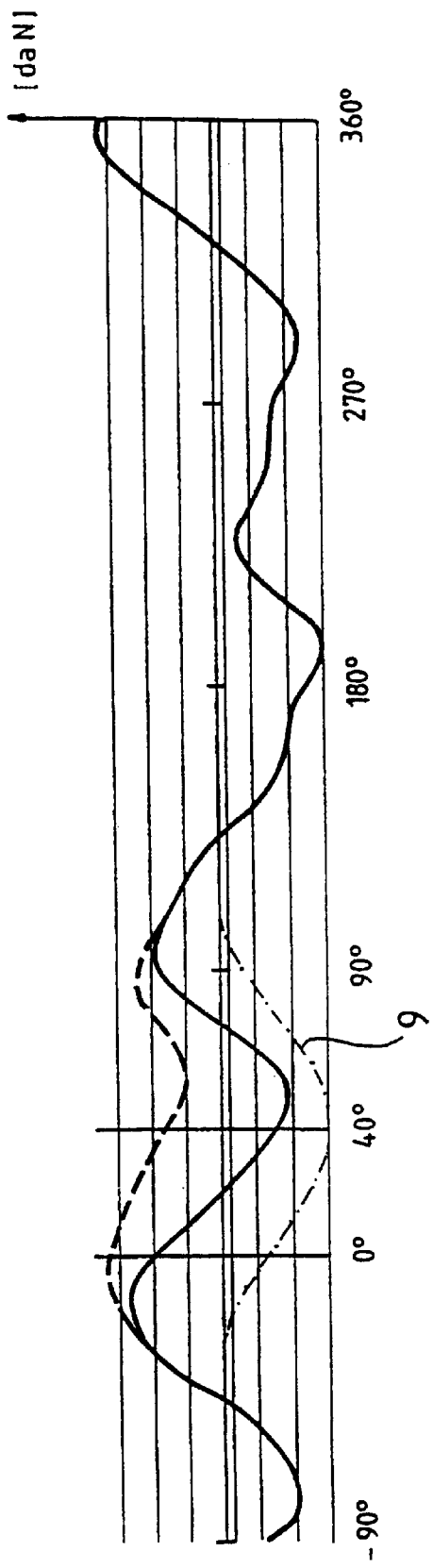
FIG. 5 shows the RKS graph achieved after that, for comparison with FIG. 2.

FIG. 5 depicts, for comparison with FIG. 2, the RKS graph achieved now: In the zone of about 40° the amplitude of the RKS-graph is lowered, specifically at −20° and at 100° by about 0.3 daN, at −10° and at 90° by about 1.1 daN, at 0° and at 80° by about 2.3 daN, at 10° and at 70° by about 3.7 daN, at 20° and at 60° by about 4.9 daN, at 30° and at 50° by about 5.7 daN, at 40° by about 6.0 daN.

Based on phase, the maximum of the reduction 9 is therefore located at the first maximum of the first (untreated) harmonic, thus 40°. Also in reference to the amount, the maximum of the lowering is preferably somewhat larger, here about 6.0 daN at the maximum of the first (untreated) harmonic.

In order to facilitate the comparison with FIG. 2 that depicts the original state, the X-axis indicated by a bold line is positioned such that, outside of the treated area, i.e., from 100° through 340°, there is congruence between FIG. 2 and FIG. 5, when the X-axis indicated by a bold line here is made congruent with the X-axis of FIG. 2.

However, since the average wheel load remains stabile, of course, the integral of the variation in the radial force must by definition be exactly 0 over the length of a period, the actually valid X-axis is positioned somewhat lower, specifically by the integral of the lowering function listed two paragraphs above over dphi divided by 360°.

If the device were also to be used for reducing the amplitude of the second harmonic, first the amplitude and phase position of this second harmonic would have to be detected, the tire to be treated would have to be rotated into the correct angular position in reference to the device and then the treatment would have to be performed. In the treatment of the second harmonic in which a plastic deformation according to the invention of the beads is to be achieved in the zenith of the two device sections, both sections must be hot. In this context, it may be advisable to concentrate the heat influence more strongly on the zenith by a different heating coil that has a sharper spatial focus on the zenith in question.

Figure 6:
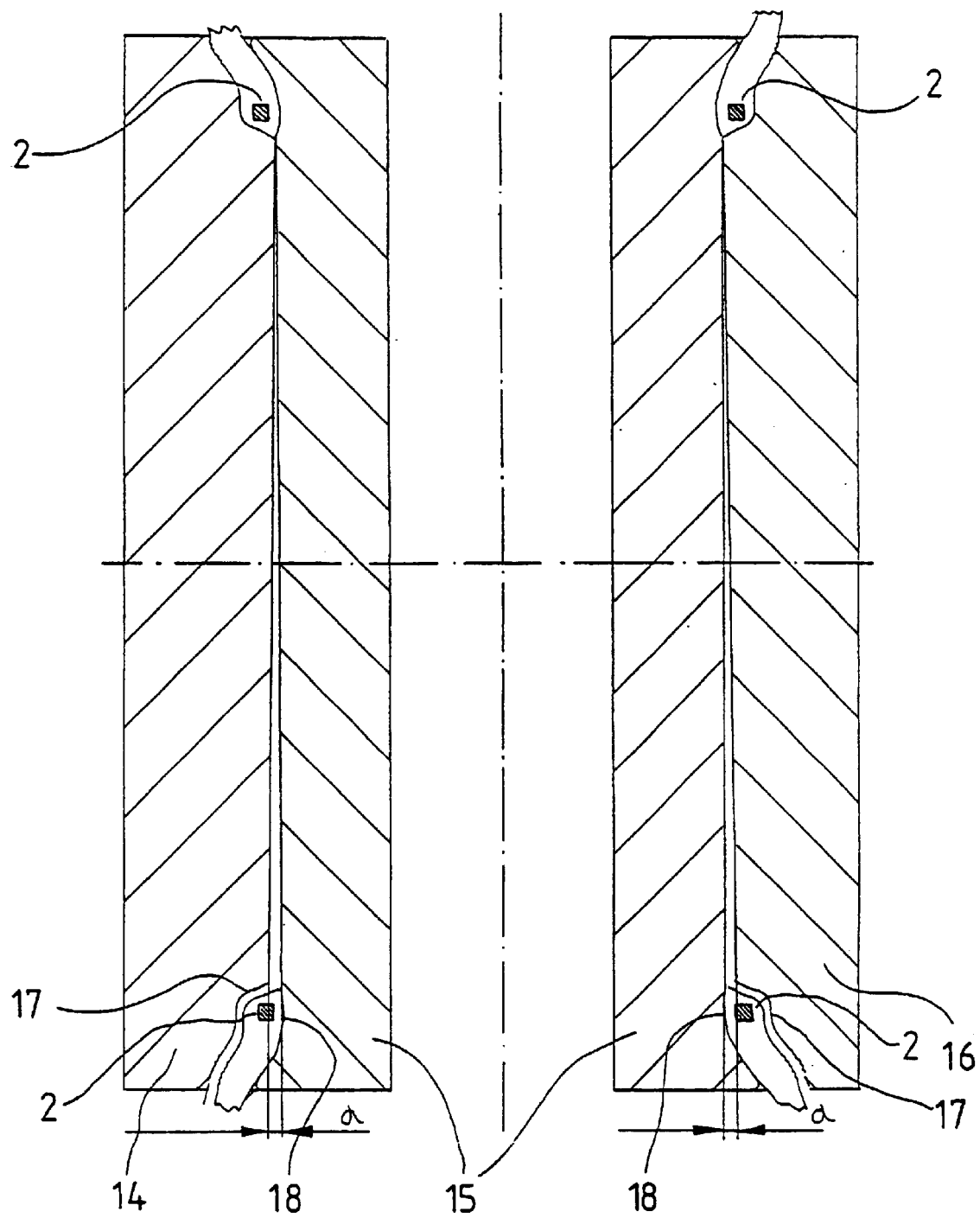
FIG. 6 shows a schematic view of a device that can be used for raising minima of the RKS graph via intervention by the application of axial force.

FIG. 6 schematically depicts a device that is used for the raising of the minima of the RKS graph by application of axial force. It has two axially outer shells 14 and 16 which each have, on their side facing each other, which is to say the axially inner sides, a groove 17 open axially inward whose cross-section profile equals the negative of the bead profile at the radially inner and axially outer side.

A middle shell 15 is located between each of the two outer shells 14 and 16. It has on its two axially outer edges each a shallow groove 18. This groove surface is used to act on the axially inner side of the relevant bead 2 of the tire to be treated.

The two outer shells 14 and 16 are now moved together for the purpose of plastic bead deformation according to the invention. It is useful if they are freely adjustable in a small angular range by ball bearing or a cardanic suspension. In a first step, these outer shells 14 and 16 are only moved far enough toward one another that, by mediation of the left clamped bead 2, the middle shell 15 (that can stand rigidly) and the right bead create a force of pressure that is at least large enough that the breakaway torques caused by static friction of the joined positioning can be overcome but are small enough in relation to the temperature that they do not yet create a plastic deformation of the bead. The angular position of the outer plates 14 and 16 in relation to the middle plate 15 created here is stored.

This first mentioned step with low force serves for the calibration of the zero-level of plate slopes to be adjusted later. In a tire construction machine, in particular in an automatically controlled one, if the overlapping areas always occur in the same position and the width of the overlaps from one tire to another is always the same then it is also sufficient when this first calibrating step is only performed for the first one and thereafter is only performed on a sampling basis.

Starting in the neutral position, however, it was determined in the individual case, of the outer shells 14 and 16 that act like pressure clamps, these are then declinated.

"Declination" here means an inclination of the outer shells 14 and 16 by an angle Alpha in such a way that in the areas brought closer to the center shell, which are positioned where the radial force minimum had been before the treatment, the bead is axially pressed strongly enough in relation to the bead temperature to such an extent that a plastic deformation occurs. The rubber that is forced away locally in this way arrives mainly at the radially inner side of the bead where it enlarges the distance between the bead core and the tire seat surface on the rim extending approximately axially after mounting on a rim. Thus the tread, connected via the fibers of the carcass to such a place, arrives on a larger radius, which causes a locally enlarged radial force, thus a reduced radial force minimum.

In this context, it is also possible to declinate the outer plates under pressure as well as first declinating them without pressure, to fix them in the declination angle opposite an axially guided pressure piston and then expose them to pressure by the axially inward moving pressure piston.

As has already been discussed in the general part of the description, a local concentration of heat to the regions to be deformed is possible as an alternative or in addition to declination; however, as long as deviations in the temporal succession occur due to pauses, delivery times, and the like, this leads to somewhat smaller reproduction accuracies.

Figure 7:
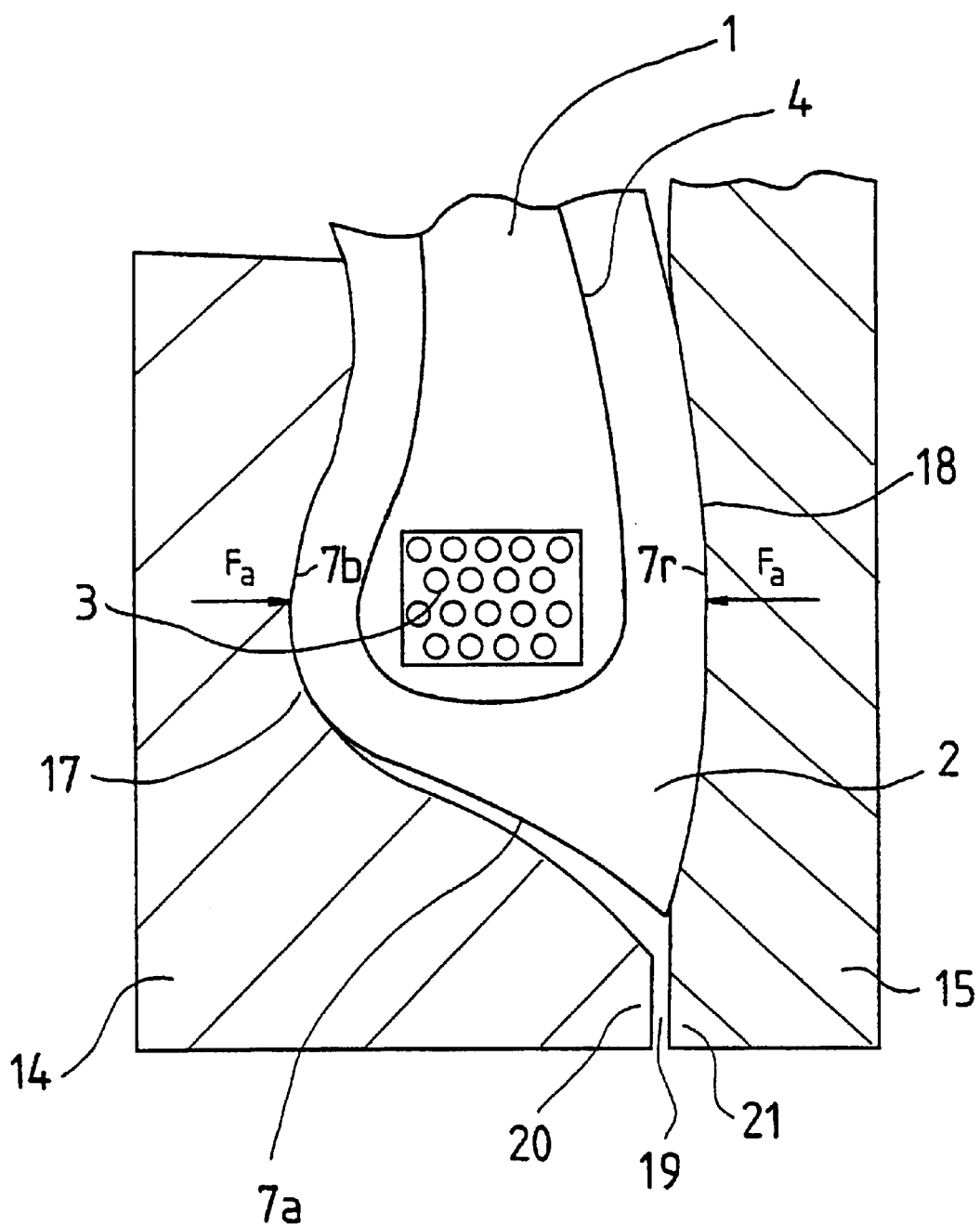
FIG. 7 shows in an enlarged section from FIG. 6 the bead area of the tire to be treated together with the two tools for impact.

In an enlarged detail of FIG. 6, FIG. 7 shows a (left) bead 2 of the tire 1 to be treated with a Pierce bead core 3 embedded therein on which a radial carcass 4 is anchored by way of wrapping. The left shell 14 with its groove 17 and the middle shell 15 with its groove 18 stand ready for the plastic deformation of this bead 2 according to the invention.

The two shells 14 and 15, only part of which is shown here, have been moved together just far enough that they are holding the bead 2 between axially outer surface 7b and axially inner surface 7r axially outwardly between the groove 18 of the shell 15 and the radially outer zone of the groove 17 of the shell 14 with light pressure by way of an axial force Fa. On the other hand, the radially inner seat surface 7a of the bead 2 is not yet touching the corresponding zone of the groove 17 of the left shell 14. In this initial phase, a gap 19 remains between the contact surfaces 20 and 21 of the shells 14 and 15 (and naturally also between the shells 15 and 16, which are not visible here).

Figure 8:
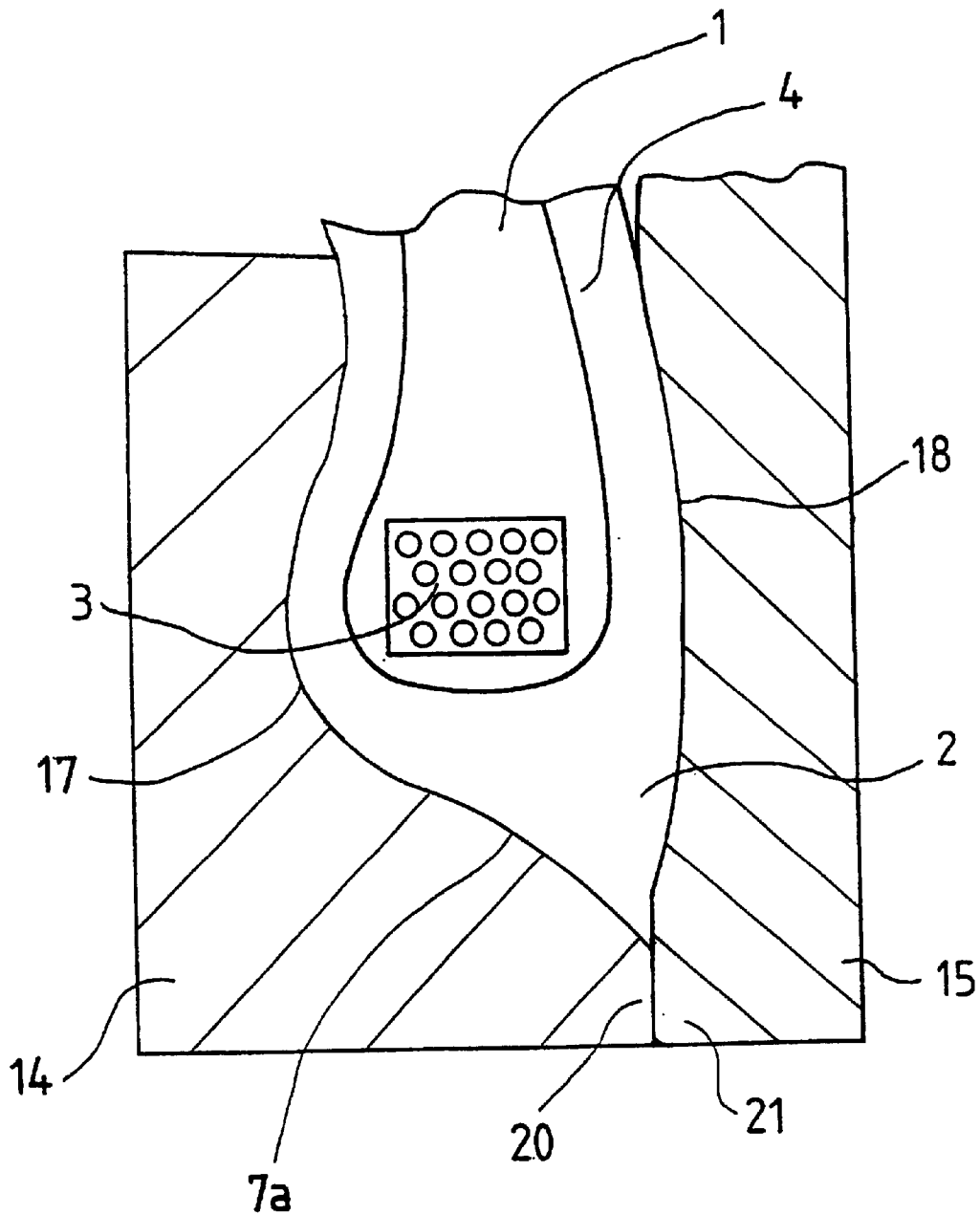
FIG. 8 shows in a similar fashion to FIG. 7, the same tire area after completion of the bead treatment with the tools still in contact.

Analogously to FIG. 7, FIG. 8 shows the same tire region, but after the two shells 14 and 15 have been moved together. The maximum possible path of displacement of the shell 14 to the right against the shell 15 is limited by the contact surface 20 of the left shell 14 and 21 of the middle shell 15. Here, the outermost possible displacement is shown, after which the two contact surfaces 20 and 21 are in contact with one another, and therefore the gap 19 visible in FIG. 7 has disappeared. However, this depiction is not intended to mean that the maximum possible displacement path should be used in every case; rather, the size of the local path of displacement should be adapted to the amplitude of the first harmonic of the radial force variation (RKS) that is to be reduced in the bead 2 of the tire 1 to be treated.

The shells 14 and 15 (and naturally also the shell 16, which is not visible here) are hot, in particular in the circumferential region in which the tire is to be deformed. The shells can also be tempered locally in a uniform fashion so that the local differentiation between none, small, and relatively large bead deformation is achieved solely by way of the pressing force distribution of different magnitudes.

As shown in FIG. 6, the pressing force of different magnitudes in this device is achieved by way of the diagonal arrangement of the outer shells by an angle alpha; here, the angle alpha between the left shell 14 and the middle shell 15 need not conform with the other angle alpha between the middle shell 15 and the right shell 16. Rather, by way of a still more exact differentiation, a radial force variation of different sizes in one left and one right measuring path can be combated, i.e., a conicity of the tire 1 varying over the circumference. Within narrow limits, it is even possible to reduce a conicity that is present over the entire circumference if the treatment of just one of the two beads would be sufficient for reducing the radial force variation.

After keeping the deforming shells 14 and 16 in the moved together position shown in FIG. 8 for a certain time, approximately 20 minutes, the bead treatment can be completed; for this purpose, the shells 14 and 16 are moved back axially outwards and the tire 1 is removed.

The exemplary embodiments shown shall not limit the scope of protection of this invention. Rather, they serve only the purpose of more detailed explanation. The above-mentioned measurements have been tested and confirmed in initial experiments. The essential part of the invention is that, in a process for post-treatment of beads for the purpose of improving the uniformity of a tire, instead of the known, regional sanding of the bead surfaces, a regional plastic deformation of the bead is used. Not only the radial force maximums can be decreased thereby, as with sanding, but also the radial force minimums can be increased.

A list of reference numbers is part of the description.

LIST OF REFERENCE NUMBERS

1 Tire
2 Beads of the tire
3 Bead core
4 Carcass
5 Sidewalls
7a radially inner seat surface of each bead 2 running essentially in the axial direction (for short: bead seat surface)
7b axially outer surface of each bead 2 running essentially in the radial direction
7r axially inner surface of each bead 2 running essentially in the radial direction
9 Lowering function over the angle (see dot-dash lines in FIG. 5)
10 Markings=marking of RKS extremes
11 Upper section of a bead pressing device acting radially
11.1 Flat portion on the jacket edge of 11
12 Lower section of a bead pressing device acting radially
12.1 Flat portion on the jacket edge of 12
13 Electrical resistance heater in the section 11 and optionally also in the section 12 (for treating the second harmonic as well)
14 Left axially outer shell of the device according to FIGS. 6 and 7 for the purpose of axial bead pressing
15 Middle shell of the device according to FIGS. 6 and 7 for the purpose of axial bead pressing
16 Right axially outer shell of the device according to FIGS. 6 and 7 for the purpose of axial bead pressing
17 Groove in the axially outer shells 14 and 16 of the device according to FIG. 6 for accepting the bead 2 of the tire 1
18 Grooves in the axially middle shell 15 of the device according to FIG. 6 for accepting the bead 2 of the tire 1
19 Gap between the contact surfaces 20 and 21 in FIG. 7
20 Contact surface on the left shell 14
21 Contact surface on the middle shell 15
Fa Force pressing axially outwards against 7r from axially inwards and axially inwards against 7b from axially outwards
$F_R$ Force pressing radially outwards against 7a from radially inwards Hanover, Aug. 14, 1998 em4910 KK/kk

What is claimed is:

1. A process for improving a concentricity of a pneumatic vehicle tire having a bead, the process comprising:
    subjecting at least a portion of the bead, after vulcanization, to a plastic deformation post-treatment by subjecting the portion of the bead to a deforming force and a temperature change,
    wherein the post-treatment improves the concentricity of the tire.
2. The process of claim 1, wherein the portion of the bead is deformed without material being removed during the post-treatment.
3. The process of claim 1, wherein the subjecting comprises applying locally an essentially axial force component $F_R$ to a seat surface of the portion of the bead, the force component being directed radially outwards from a radially inwards position.
4. The process of claim 3, wherein the subjecting further comprises locally heating a seat surface of the portion of the bead.
5. The process of claim 1, wherein the subjecting comprises locally heating a seat surface of the portion of the bead.
6. The process of claim 1, wherein the subjecting comprises applying locally an essentially radial force component $F_R$ to a seat surface of the portion of the bead, the force component being directed radially outwardly from a radially inwardly position.
7. The process of claim 6, wherein the subjecting further comprises locally heating a seat surface of the portion of the bead.
8. The process of claim 1, wherein the subjecting comprises locally heating a seat surface of the portion of the bead.
9. The process of claim 6, wherein the force component $F_R$ is between 50 and 150 N per mm of a circumferential length of a sector of a bead seat surface.
10. The process of claim 3, wherein the force component $F_R$ is between 50 and 150 N per mm of a circumferential length of a sector of a bead seat surface.
11. The process of claim 5, wherein the heating comprises heating at a temperature of between 100° C. and 230° C.
12. The process of claim 11, wherein the temperature is between 160° C. and 180° C. for between 10 minutes and 45 minutes.
13. The process of claim 8, wherein the heating comprises heating at a temperature of between 100° C. and 230° C.
14. The process of claim 13, wherein the temperature is between 160° C. and 180° C. for between 10 minutes and 45 minutes.
15. The process of claim 1, wherein the subjecting comprises locally applying a force component Fa to axially compress the portion of the bead.
16. The process of claim 15, wherein the subjecting further comprises locally heating a seat surface of the portion of the bead.
17. The process of claim 16, wherein the force component Fa is between 50 and 150 N per mm of a circumferential length of a sector of a bead seat surface.
18. The process of claim 16, wherein the heating comprises heating at a temperature of between 100° C. and 230° C.
19. The process of claim 18, wherein the temperature is between 160° C. and 180° C. for between 10 minutes and 45 minutes.
20. The process of claim 16, wherein the heating comprises heating an upper portion of the portion of the bead.
21. The process of claim 1, further comprising
    determining at least one location when a radial quantity R of the tire exceeds a threshold value; and
    reducing the radial quantity R of at least that location when the threshold value is exceeded.
22. The process of claim 21, wherein the radial quantity R is a radial force.
23. The process of claim 21, wherein the reducing comprises causing a portion of a bead core arranged in the bead to move toward a bead seat surface.
24. The process of claim 1, further comprising
    determining at least one location when a radial quantity R of the tire falls below a threshold value; and
    increasing the radial quantity R of at least that location when the threshold value is exceeded.
25. The process of claim 24, wherein the radial quantity R is one of a radial force and a tread radius.
26. The process of claim 24, wherein the increasing comprises causing a portion of a bead core arranged in the bead to move away from a bead seat surface.
27. The process of claim 21, wherein the radial quantity R is determined over at least one complete turn of the tire and as a function of a angle of rotation of the tire.

28. The process of claim 24, wherein the radial quantity R is determined over at least one complete turn of the tire and as a function of a angle of rotation of the tire.

29. The process of claim 27, wherein at least one of a first, a second, and a third harmonic of the function is determined using a Fourier analysis.

30. The process of claim 28, wherein at least one of a first, a second, and a third harmonic of the function is determined using a Fourier analysis.

31. The process of claim 29, wherein the quantity R is reduced when a maximum of at least one of the first harmonic, the second harmonic and the third harmonic is determined.

32. The process of claim 30, wherein the quantity R is increased when a minimum of at least one of the first harmonic, the second harmonic and the third harmonic is determined.

33. The process of claim 21, wherein each of a maximum of the quantity R the maximum of the first harmonic is reduced and wherein each of a minimum of the radial quantity R and the minimum of the first harmonic is increased.

34. The process of claim 32, wherein each of a maximum of the quantity R the maximum of the first harmonic is reduced and wherein each of a minimum of the radial quantity R and the minimum of the first harmonic is increased.

35. The process of claim 1, wherein the portion of the bead is deformed according to the formula:

$$t = c \frac{\delta R}{(T - T_o)^2}$$

wherein $\delta R_f$ is a desired change in radial force to be determined;

wherein T is a predetermined deformation temperature;

wherein c is a constant which is dependent on a rubber mixture;

wherein $T_0$ is a glass transition temperature of the rubber mixture used in an area of the bead; and wherein t is the time required to affect a change in the portion of the bead.

36. The process of claim 35, wherein c is between 1.0 and $2.8 \times 10^{-7}$ mm$^2$/K$^2$s.

37. The process of claim 36, wherein c is between 1.6 and $1.8 \times 10^{-7}$ mm$^2$/K$^2$s.

38. A process for improving a concentricity of a pneumatic vehicle tire having two beads, the process comprising:

subjecting at least a portion of one bead, after vulcanization, to a plastic deformation post-treatment by subjecting the portion of the one bead to a deforming force and a temperature change;

subjecting at least a portion of another bead, after vulcanization, to a plastic deformation post-treatment by subjecting the portion of the other bead to a deforming force and a temperature change;

wherein the post-treatment improves the concentricity of the tire.

39. The process of claim 38, wherein each subjecting occurs separately.

40. The process of claim 38, wherein each subjecting occurs simultaneously.

41. The process of claim 38, wherein each of the beads is subjected to a different amount of plastic deformation post-treatment.

42. The process of claim 38, wherein different portions of each of the beads is subjected to a different amount of plastic deformation post-treatment.

43. A process for improving a concentricity of a pneumatic vehicle tire having a bead, the process comprising:

mounting the tire on a drum which comprises at least one of an internal heating mechanism and an internal cooling mechanism;

subjecting at least a portion of the bead, after vulcanization, to a plastic deformation post-treatment using the drum by subjecting the portion of the bead to a deforming force and a temperature change, wherein the post-treatment improves the concentricity of the tire.

44. A device for improving a concentricity of a pneumatic vehicle tire having a bead, the device comprising:

a drum having a surface which engages a radially inner bead seat surface of the tire the drum comprising at least one of an internal heating mechanism and an internal cooling mechanism;

the drum being adapted to plastically deform at least a portion of the bead of the tire so as to affect at least one of a first, a second, and a third harmonic, wherein the plastic deformation improves the concentricity of the tire.

45. The device of claim 44, wherein the drum comprises at least two curved segments which are mechanically moveable relative to one another.

46. The device of claim 45, wherein at least one of the segments is heated by the internal heating mechanism.

47. The device of claim 45, wherein at least one of the segments is cooled by the internal cooling mechanism.

48. The device of claim 45, wherein each segment comprises a surface which is adapted to engage a radially inner seat surface of the bead.

49. The device of claim 45, wherein at least one of the segments is axially moveable.

50. The device of claim 45, wherein at least one of the segments is radially moveable.

51. The device of claim 50, wherein the at least one segment can absorb a radial force equal to a product of 50 N/mm times a circumferential length of the at least one segment.

52. The device of claim 46, wherein the internal heating mechanism is capable of heating to a temperature of between 100° C. and 230° C.

53. The device of claim 52, wherein the internal heating mechanism is capable of heating to a temperature of between 160° C. and 180° C.

54. The device of claim 47, wherein the internal cooling mechanism is capable of cooling to a temperature below 100° C.

55. The device of claim 54, wherein the internal cooling mechanism is capable of cooling to a temperature below 75° C.

56. The device of claim 45, wherein each segment is separately movable to different positions.

57. The device of claim 45, wherein each segment can be adjusted to a different temperature.

58. The device of claim 45, wherein the drum includes at least one flattened portion in an area where the segments meet.

59. The device of claim 44, wherein the drum is capable of causing the bead to vibrate.

60. The device of claim 59, wherein the drum is capable of causing the bead to vibrate in an ultrasonic range.

61. The device of claim 44, wherein the drum is adapted to simultaneously plastically deform the portion of the bead and to cause a rubber of the bead to vibrate.

62. A process for improving a concentricity of a pneumatic vehicle tire having beads, wherein, after vulcanization of the tire, the process comprises:

determining a radial quantity of the tire;

performing a Fourier analysis; and changing the radial quantity based upon the Fourier analysis by subjecting at least a portion of at least one bead to a deforming force and a temperature change such that the at least one bead experiences plastic deformation.

* * * * *